United States Patent [19]

Laumen

[11] Patent Number: 4,795,618

[45] Date of Patent: Jan. 3, 1989

[54] HEAT EXCHANGER

[76] Inventor: Michael Laumen, Am Brustert 47, D-4150 Krefeld, Fed. Rep. of Germany

[21] Appl. No.: 879,128

[22] PCT Filed: Sep. 26, 1985

[86] PCT No.: PCT/DE85/00337

§ 371 Date: Jul. 25, 1986

§ 102(e) Date: Jul. 25, 1986

[87] PCT Pub. No.: WO86/02016

PCT Pub. Date: Apr. 10, 1986

[30] Foreign Application Priority Data

Sep. 26, 1984 [DE] Fed. Rep. of Germany ....... 3435319

[51] Int. Cl.[4] .......................................... F28D 21/00
[52] U.S. Cl. .................. 422/202; 422/222; 422/312
[58] Field of Search ............. 422/211, 222, 312, 202, 422/198

[56] References Cited

U.S. PATENT DOCUMENTS

| | | | |
|---|---|---|---|
| 1,949,205 | 2/1934 | Herring et al. | 422/222 |
| 2,034,715 | 3/1936 | Dreyfus | 422/222 X |
| 2,127,561 | 8/1983 | Herrmann. | |
| 2,459,907 | 1/1949 | Winslow et al. | 422/222 X |
| 3,073,685 | 1/1963 | Grove, Jr. et al. | 422/222 X |
| 3,135,703 | 6/1964 | Sill | 422/222 X |
| 3,433,299 | 3/1969 | Fleming | 165/135 |
| 3,857,680 | 12/1974 | Porta et al. | 422/200 |
| 3,966,443 | 6/1976 | Okano et al. | 60/299 X |
| 4,101,287 | 7/1978 | Sweed et al. | 422/312 X |
| 4,108,241 | 8/1978 | Fortini | 165/146 |
| 4,420,462 | 12/1983 | Clyde | 422/201 |
| 4,602,673 | 7/1986 | Michelfelder et al. | 165/7 |

FOREIGN PATENT DOCUMENTS

| | | |
|---|---|---|
| 0099441 | 2/1984 | European Pat. Off. . |
| 903986 | 12/1953 | Fed. Rep. of Germany . |
| 1998525 | 12/1963 | Fed. Rep. of Germany . |
| 1442601 | 12/1968 | Fed. Rep. of Germany . |
| 1902229 | 10/1969 | Fed. Rep. of Germany . |
| 2552686 | 4/1978 | Fed. Rep. of Germany . |
| 3035207 | 4/1982 | Fed. Rep. of Germany . |
| 3205309 | 8/1983 | Fed. Rep. of Germany . |
| 3431240 | 3/1986 | Fed. Rep. of Germany . |
| 1124497 | 10/1956 | France . |
| 0091309 | 6/1982 | Japan ................................. 422/312 |
| 7309866 | 1/1974 | Netherlands . |
| 2050189A | 1/1981 | United Kingdom ............... 422/222 |

OTHER PUBLICATIONS

"Energieeinsparung Durch Einsatz von Brennwertkesseln", Theo Jannemann, Internationale Zeitschrift fur Rationelle Energieanwendung Heft 3-1984-pp. 137-144.

Primary Examiner—Douglas Hart
Attorney, Agent, or Firm—Cushman, Darby & Cushman

[57] ABSTRACT

A heat exchanger includes a reaction section made of a porous heat-conductive material and a heat transfer section which is connected with the reaction section by a gas-tight highly heat-conductive boundary layer with the heat-conductive material of both sections made preferably of sintered metal; the reaction section sintered metal can be coated with a catalyst substance; fluid medium conduits are provided to pass a heat transfer medium through the heat transfer section while the reaction section is provided with supply and exhaust conduits for a medium to be reacted in the reaction section.

16 Claims, 3 Drawing Sheets

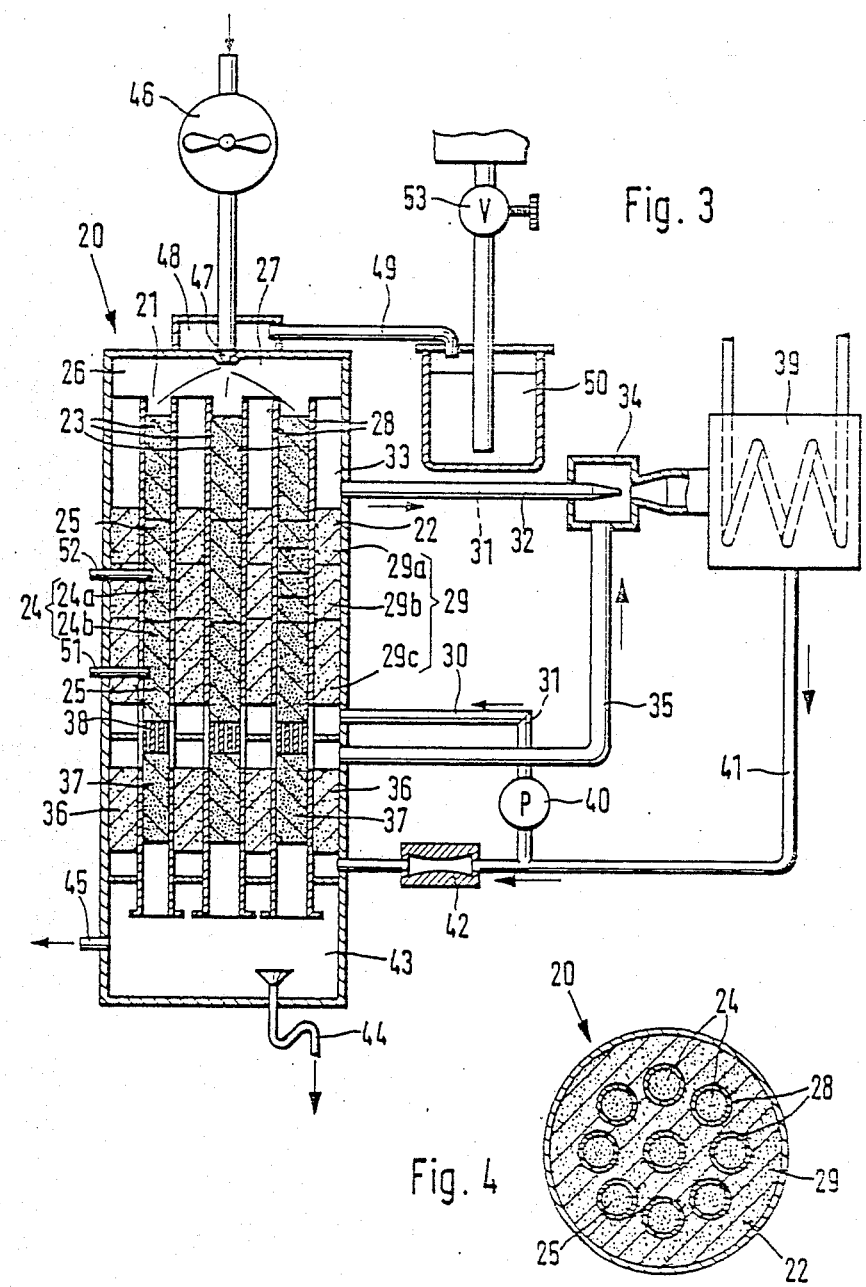

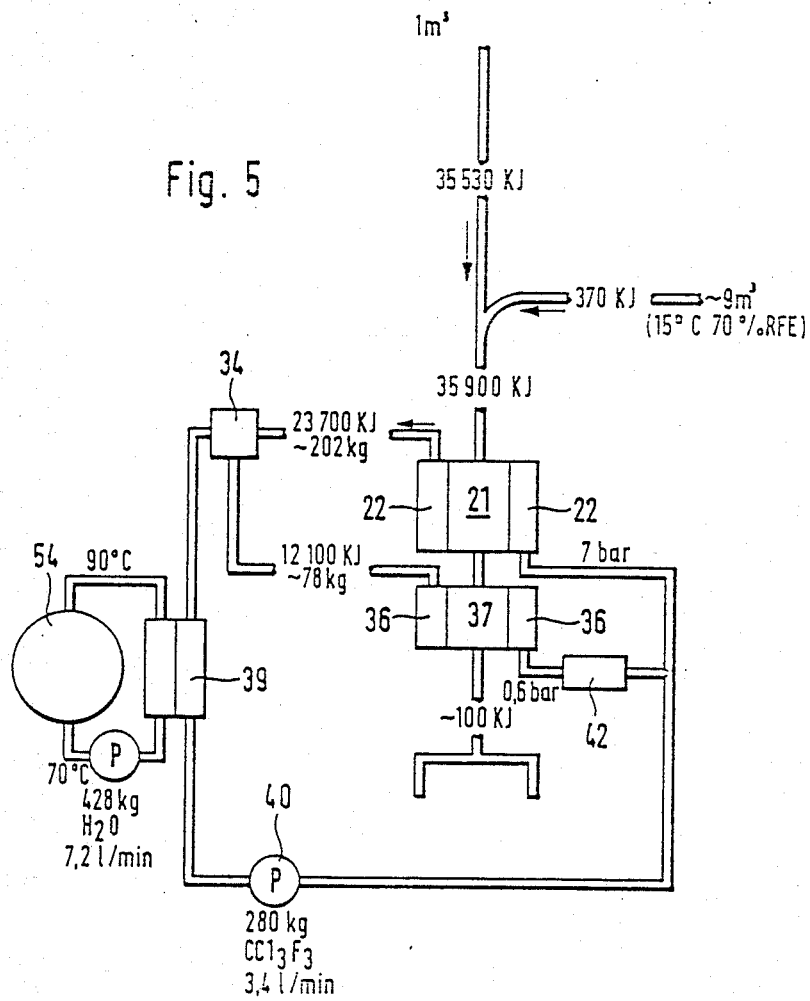

HEAT EXCHANGER

This invention relates to a heat exchanger comprising a reactor section and a heat transfer section, which is heat-conductively joined to the reactor section, in accordance with the prior art part of claim 1.

German Patent Publication No. 25 52 686 discloses a process of making porous and fibrous metal bodies, which are coated with a catalytic substance and used as exhaust catalysts for motor vehicles. Owing to the loose fibrous structure required to minimize the resistance to flow in exhaust gas catalysts, the heat conduction in such metal bodies is not very effective.

German Patent Specification No. 903,986 discloses for a catalytic generation of heat an apparatus in which a wire mesh made of a catalytic substance is provided on a heat exchanger surface and a connecting layer is provided to ensure a direct metallic, effective heat-conductive contact between the catalyst carrier and the catalytic substance. In such a design the effective heat exchanger surface is increased but that ratio of area to volume is inadequate for an efficient heat exchanger for maintaining a small temperature difference between the heat-delivering and the heat-receiving fluids. Another disadvantage of the apparatus disclosed in German Patent Specification No. 903,986 resides in that the evaporating surface is of conventional design so that the evaporative capacity is limited to about 5000 W/m$^2$K by the coefficient of heat transfer $a_1$ between the evaporator surface and the fluid to be evaporated, e.g., during film evaporation. Besides, that proposal inevitably involves a high expenditure for expensive catalytic material.

German Utility Model No. 19 98 525 discloses a heat exchanger comprising heat exchanger tubes embedded in a porous body made of metallic particles. Just as in the apparatus known from German Patent Specification No. 903,896, the heat transfer in that heat exchanger is limited by the coefficient of heat transfer between the smooth-surface of the heat exchanger tube and the liquid flowing in said tube.

It is an object of the invention to provide a heat exchanger which is in accordance with the prior art part of claim 1 and which permits a heat transfer with a much higher heat flux density to be achieved between the heat-receiving and the heat-delivering sides.

Because the cross-section of the flow passage of the heat transfer section in at least part of the length thereof is at least approximately completely filled with the porous heat-conductive material, the large internal surface of the porous heat-conductive material is available as a heat exchange surface for the transfer of heat to or from the heat transfer fluid. The heat-conductive material contained in the reactor section is in direct heat-conductive connection to the heat-conductive material in the heat transfer section by means of the boundary layer (partition) so that heat is transferred only by heat conduction from the reactor section to the heat transfer section or vice versa. As a result, the heat flux density is mainly limited by the heat thermal conductivity of the boundary layer. Because the boundary layer disposed between the porous heat-conductive material of the reactor section and the porous heat-conductive material of the heat transfer section is in an effective heat-conducting contact with said materials and for this reason is hardly stressed in compression, said boundary layer may be thin so that in case of the use of a boundary layer consisting of effectively heat-conducting metal layers having a thickness of about 1 mm a transfer of reaction heat at a rate of 380,000 W/m$^2$K, based on the surface area of the boundary layer, can theoretically be achieved.

Owing to the effective heat transfer between the reactor and heat transfer sections, the temperature in the reactor bed of the reactor section can be controlled as desired by a control of the rate or temperature of the heat transfer fluids and/or of the educts. In particular, a uniform temperature distribution in the reactor bed can be achieved.

In accordance with the invention the heat-conductive material in the reactor section and/or in the heat transfer section consists of sintered metal. Owing to the bridges of sintered metal which interconnect the particles of sintered metal and which join the particles of sintered metal in the heat transfer section and in the reactor section to the boundary layer, the thermal conductivities of such arrangement are of the same order as the thermal conductivities of metal. In case of a phase transition of the heat transfer fluid, the resulting coefficients of heat transfer will constitute the smallest parameter of such heat exchanger system. Measurements taken by Union Carbide have shown that said values may amount to as much as 70,000 W/m$^2$K, based on the outer flow-receiving surface of the sintered metal, so that the power densitiy of such heat exchanger system is higher by a power of ten than the power density of conventional heat exchanger systems.

In accordance with the invention a desirable development of the invention resides in that the large internal surface of the porous heat-conductive material is coated at least in part with a catalytic substance. Various chemical reactions can thus be accelerated or initiated in dependence on the catalytic substance which is employed. In case of a catalytic oxidation of fuels, a very small temperature difference between the reactor and heat transfer sections can be achieved in the heat exchanger in accordance with the invention owing to the high heat flux density of the heat transfer between the reactor and heat transfer sections so that the energy losses will be minimized. In case of a phase transition of the heat transfer fluid in the heat transfer section the temperature at which the catalysis takes place can be controlled by a selection of a high heat flux in the heat transfer section and of a suitable heat transfer fluid and of a suitable phase transition temperature so that hydrogen can be catalytically oxidized at relatively low temperatures and with a $\Delta T < 1K$ between the reactor and heat transfer sections. A temperature difference of 170° C. is recommended under comparable conditions in conventional systems for a catalytic combustion, such as are known, e.g., from Published German Application No. 903,896.

In accordance with the invention the chemical reaction can be optimized in that at least part of the educts is supplied in controlled manner to certain regions of the reactor section and/or portions of the resulting products are withdrawn from certain regions. The controlled supply and/or withdrawal is effected by supply and/or discharge lines distributed over the length of the reactor section.

In accordance with the invention the heat transfer section desirably constitutes also at least one flow passage, which lies or lie particularly in the flow passage of the reactor section. As a result, the length of the path on which heat is transferred from the reactor section to the heat transfer section is minimized. In an alternative arrangement the flow passage or passages of the heat transfer section may lie in the flow passage of the reactor section.

In accordance with the invention the flow-delivering surface area and/or the flow-receiving surface area of the porous heat-conductive material in the reactor section may exceed the cross-sectional area of the associated flow passage and in particular may be inclined and/or non-planar so that more educts and/or heat transfer fluid can flow through the porous heat-conductive material in a shorter time.

If the porous heat-conductive material in the flow passages is designed in accordance with the invention, the expansion and escape of any vapor generated in the heat transfer section will be promoted as well as the expansion and escape of the exhaust gases in the reactor section. In accordance with the invention the proportion of that cross-sectional area of the flow passages which is filled with porous heat-conductive material may decrease continuously or in steps in the direction of fluid flow. For instance, the porous heat-conductive material may be formed with bores of flow passages having a diameter which changes in steps or which are conical. The porous heat-conductive material may have, e.g., the shape of a frustum of a cone.

In accordance with the invention the expansion of exhaust gas or vapor may be promoted in that the porous heat-conductive material in the reactor section and/or in the heat transfer section is packed less densely in the downstream portion than in the upstream portion. If the porous heat-conductive material consists of sintered metal made of a porous sintered metal power, this can be accomplished in that the sintered metal contained in the reactor section and/or in the heat transfer section has different particle sizes and/or non-woven structures as well as different capillary structures and dimensions.

In accordance with the invention the improvements of the invention may be applied to a single block of porous heat-conductive material contained in each of the reactor and heat transfer sections may be composed of a plurality of block segments. This may be desirable for various reasons, such as reasons of manufacturing technology.

In accordance with the invention the flow passages of the reactor section and/or of the heat transfer section are so designed that their boundary wall is clear of the sintered metal in the entrance portion of the passages.

This will promote the inflow of the educts or of the heat transfer fluid into the porous heat-conductive material.

Owing to the improvements of the heat exchanger will have the result that the expansion of vapor or the expansion of the exhaust gas or product gas will be allowed for or the ingress of the heat transfer fluid and/or of the educts into the sintered metal will be facilitated. This permits of a control of the mass flow through the flow passages and, as a result, of the heat transfer from the reactor section to the heat transfer section.

In accordance with the invention the porous heat-conductive material in the reactor section may be used to preheat and/or filter the educts in that portion which is the upstream portion in the direction of flow of the educts. Because the porous heat-conductive material used as a preheater is in heat-conductive contact with the remaining porous heat-conductive material in the reactor section, the fresh educt which has been supplied will be heated to the reaction temperature as it flows through said portions so that energy losses will be avoided. Owing to the porous structure of the porous heat-conductive material the educts which have been supplied can be filtered. For that purpose, individual segments of the reactor section may be supplied with different catalytic substances, e.g., in order to protect valuable downstream catalytic substances. Catalyst poisons can be removed in that manner.

In accordance with the invention a particularly desirable improvment of the invention resides in that the reactor is succeeded by a cooler for extracting heat from the product gas stream by a sensible cooling and/or by a condensation of the condensible gases, particularly water vapor, which are contained in the product gas stream.

In accordance with the invention that cooler consists also of sintered metal owing to its excellent heat-conducting properties.

In accordance with the invention the porous heat-conductive material of the reactor bed may be thermally separated from the cooler by a spacing section in order to inhibit an undesired direct heat flux between said sections.

In accordance with the improvements of the invention the cooler constitutes a low-temperature evaporator section of a heat pump circuit. As a result, the cooler can always assume temperatures below the condensation temperatures of substances contained in the product gas stream.

In a particularly preferred embodiment the heat exchanger in accordance with the invention is used as a vapor generator. In that case, fuel gas or synthesis gas is supplied to the reactor section and is catalytically oxidized in the reactor bed consisting of porous heat-conductive material. The heat thus generated is transferred through the effectively heat-conducting boundary layer to the porous heat-conductive material of the heat transfer section, which is supplied with the heat transfer fluid as a fluid to be evaporated. That fluid is then evaporated on the large internal surface of the porous heat-conductive material. In conventional evaporators, a given Q/A ratio (transferred heat/transfer surface area) between the heat source and the evaporating fluid cannot be achieved unless $\Delta T$ is between 8 and 13K. In the steam generator in accordance with the invention the same Q/A value can be achieved even if $\Delta T$ is only between 0.5 to 1.3K.

Because sintered metal is used in the reactor section and in the vapor-generating section, which are separated by the effectively heat-conducting boundary layer, an operation is possible with a temperature difference $<1K$ between the temperature level at which the heat is generated and the temperature level at which the heat is "consumed", i.e., the evaporation temperature of the heat transfer fluid. In conventional systems effecting a catalytic combustion, such as are described, e.g., in Published German Application No. 903,806, a temperature difference of 170° C. is recommended if the catalyst is at a temperature of 250° C. so that the evaporation can be effected at 80° C.

In accordance with a particularly advantageous improvement of the vapor generator, a succeeding cooler is included in the product gas stream. Additional sensible heat and the heat of condensation of the water vapor contained in the product gas stream can be extracted from the product gas stream by means of the cooler. As a result, as in the process known from the so-called "heating value boiler", it is possible to utilize not only the lower heating value Hu of the fuel gas mixture but also its upper heating value $H_o$, which is higher by the heat of condensation of the condensing product (consisting of water vapor in case of a combustion). If the cooler constitutes a low-temperature evaporation section of a heat pump circuit, the temperature in the exhaust gas cooler will always be lower than the dew point temperature of the exhaust gas, which will lie between 58° and 53° C., in dependence of the excess of air used for the combustion. For this reason the use of a cooler which constitutes the low-temperature evaporator section of a heat pump circuit will ensure that the upper heating value $H_o$ of the fuel gas will be utilized under all operating conditions.

A synopsis regarding the various concepts of heating value equipment is apparent from the article "Energieeinsparung durch den Einsatz von Brennwertkesseln" in the periodical "Gas", Nos. 2 and 3, 1984. A difference from said heating value equipment resides in that the present invention makes energy available in a state in which it can be used to perform work.

Such steam generators in accordance with the invention are particularly suitable as means for motive vapor-powered thermal machines or prime movers. Owing to the high power density of the vapor generator and the resulting improvement of the coefficient of performance of a thermal machine or prime mover, e.g., a refrigerating system or a heat pump, a combined application for heating and cooling purposes is particularly contemplated.

Further details, features and advantages of the invention will become apparent from the following description of a plurality of embodiments with reference to the drawings.

FIG. 3 is an illustrative embodiment of a heat exchanger in accordance with the invention used to generate motive vapor in a refrigerating system or heat pump.

FIG. 4 is a sectional view showing the embodiment of FIG. 3.

FIG. 5 shows an energy balance sheet of the embodiment of FIGS. 3 and 4.

Figure 1:
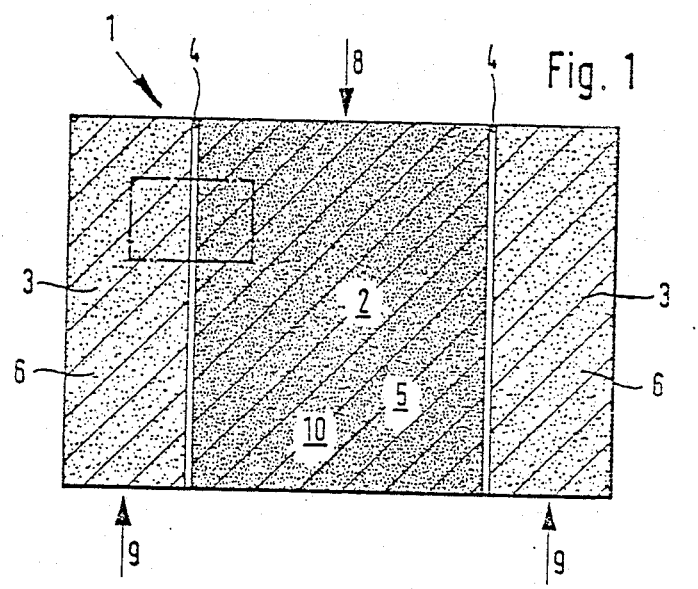
FIG. 1 is a diagrammatic representation of a first embodiment of a heat exchanger in accordance with the present invention.

FIG. 1 is a diagrammatic view showing a first embodiment of the heat exchanger in accordance with the present invention. The heat exchanger 1 consists of a reactor section 2 and a heat transfer section 3, which is heat-conductively joined to the reactor section. The reactor section 2 and the heat transfer section 3 are gastightly separated from each other by an effectively heat-conducting boundary layer 4. A block 10 preferably consisting of sintered metal constitutes a reactor bed 5 of the reactor section 2 and just as a block 6 of sintered metal of the heat transfer section 3 is sinter-bonded to the boundary layer 4 so that heat flux densities of about 380,000 $W/m^2K$, based on the contact surface area, can be achieved between the reactor section 2 and the heat transfer section 3 can be achieved through the gastight boundary layer 4.

Figure 2:
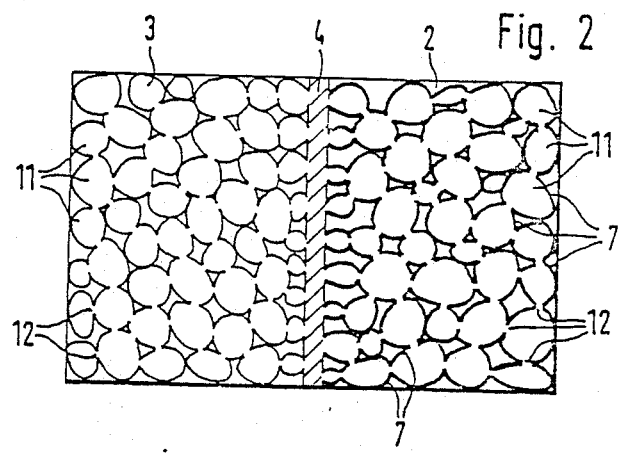
FIG. 2 is an enlarged view showing a portion of FIG. 1.

The excellent heat conduction properties of porous sintered metals are due to the fact that the individual particles of sintered metal 11 are joined to each other by bridges 12 of sintered metal, as is indicated in Figure 2, in which a portion of FIG. 1 is shown on a larger scale. The particles 11 of sintered metal of the reactor section 2 and of the heat transfer section 3 are joined by bridges 12 of sintered metal also to the boundary layer 4 so that the heat transfer between the reactor section 2 and the heat transfer section 3 is substantially improved.

In the block 10 of sintered metal in the reactor section 2 the particles 11 of sintered metal are coated with a catalytic substance 7. Educts such as gas composition 8 are fed to the reactor section 2. The educts 8 supplied into the block 10 of sintered metal of the reactor section consist of a mixture of chemical substances, which interreact in the block 10 of sintered metal owing to the presence of the catalytic substance 7. In case of an exothermic chemical reaction the liberated heat is transferred through the boundary layer 4 into the block 6 of sintered metal of the heat transfer section. Liquid heat transfer fluid 9 is supplied to the block 6 of sintered metal of the heat transfer section 3 and flows countercurrently to the educts 8 which are supplied. That liquid heat transfer fluid 9 evaporates on the large internal surface of the block 6 of sintered metal under the action of the heat which is transferred from the reactor section 2. The vaporous heat transfer fluid 9 and the reaction products of the educts 8 are removed from the heat transfer section and the reactor section, respectively, on opposite sides.

In case of an endothermic reaction of the educts 8 in the reactor section 2, gaseous heat transfer fluid 9 is supplied to the heat transfer section 3 and condenses on the large internal surface of the block 6 of sintered metal and delivers the thus liberated heat to the reactor section 2 so that the endothermic reaction is maintained. The liquid heat transfer fluid and the end products derived from the educts are also withdrawn from the heat transfer section and reactor section, respectively, on opposite sides of the heat exchanger 1.

In addition to the embodiment shown in FIG. 1 and providing for a countercurrent heat exchange between the educt and product gas stream and the heat transfer fluid, it is possible to provide heat exchanger for a heat exchange between cocurrent or crossing streams.

The reaction temperature in the reactor bed 5 of the heat exchanger 1 can be controlled by a control of the educt supply rate and by a selection of the catalytic substance 7 and of the activity and/or activity distribution of that substance and/or of the temperature of the educts and/or the heat transfer fluid. A combustion of hydrocarbons almost without a formation of $NO_x$ can be achieved in that manner, for instance. The temperature profiles in the reactor bed can also be optimized by a design of the reactor bed 5 and of the block 6 of sintered metal.

It can be stated in conclusion that the design of the heat exchanger of FIG. 1 in accordance with the invention permits a desirable utilization of the power fluxes which can be achieved in widely different fields of application and in processes for various purposes.

The power fluxes which can be achieved may also be used to influence endothermic or exothermic reactions particularly in reactions involving a catalytically accelerated oxidation. In that case the advantage will be afforded that undesired temperature gradients in the reactor bed will be eliminated with the exception of reasonable tolerances, particularly if the catalysis is to be selectively controlled by temperature.

The heat exchanger in accordance with the invention can be used as a vapor generator in heat and power circuits with a minimum expenditure of material and space.

FIG. 3 shows the use of the heat exchanger in accordance with the invention as a motive vapor generator 20 in a heat pump comprising a jet compressor. The generator 20 consists of a reactor section 21 and a heat transfer section 22, which is heat-conductively connected to the section 22. The heat transfer section 22 consists of three blocks 23, 24a and 24b of sintered metal. Of these three blocks of sintered metal the blocks 24a and 24b are coated with a catalytic substance 25 and constitute a reactor bed 24. Through a mixing chamber 26 an educt 27 consisting of a mixture of fuel gas and air is supplied to the first block 23 of sintered metal and subsequently to the blocks 24a and 24b of sintered metal of the reactor bed 24. In contact with the catalytic substance 25 the mixture 27 of fuel gas and air oxidizes with a delivery of heat. That heat is transferred by heat conduction through the sintered metal and a gastight thin metallic boundary layer 28 into a block 29 of sintered metal of the heat transfer section 22. The section 22 may alternatively consist of a plurality of segment blocks 29a, 29b, 29c of sintered metal.

Just as in the embodiments shown in FIG. 1, the several blocks 23, 24a, 24b, 29a, 29b, 29c of sintered metal are effectively heat-conductively joined to each other and to the boundary layer or partition 28. Because the block 23 of sintered metal is effectively heat-conductively joined to the reaction bed 24, the mixture 27 of fuel gas and air flowing through the block 23 of sintered metal is preheated in the block 23. The preferably replaceable block 23 of sintered metal serves also to filter the mixture 27 of fuel gas and air. For that purpose the block 23 of sintered metal may be coated, e.g., with a sulfur-combining catalyst. Through ports 51 and 52, an educt consisting, e.g., of combustion air, may directly be supplied to the blocks 24a and 24 of sintered metal coated with the catalytic substance 25. The corresponding supply lines may extend in the reactor bed 24 or, as shown, outside the reactor bed 24. In such an embodiment of the heat exchanger in accordance with the invention the progress of the reaction can be influenced in a desired manner. For instance, the formation of $NO_x$ in the combustion of hydrocarbons can be minimized if a mixture of combustion air and flue gas is supplied.

A working fluid 31 consisting of a heat transfer fluid is supplied to the heat transfer section 22 through a working fluid supply line 30. The liquid working fluid 31 enters the capillaries of the block 29 of sintered metal and absorbs the heat which is generated by the catalytic combustion in the reactor bed 24 and is transferred through the boundary layer 28. Under the prevailing pressure conditions the liquid working fluid 31 begins to evaporate, and the saturated or super-heated working fluid vapor is withdrawn through a vapor outlet 32. The block 29 of sintered metal or the block segments 29a, 29b, 29c of sintered metal in the heat transfer section 22 and the blocks 23, 24a and 24b of sintered metal in the reactor section 21 may have different structures in the direction of flow. For instance, the particle size of the blocks of sintered metal may increase in the direction of flow and/or their proportion of capillary volume may increase in that direction in order to allow for the expansion of the vapor and/or of the product gas and to effect a desired gradation of the catalytically active surface area or/and to optimize the resistance to the flow of exhaust gas in relation to the rate of flue gas. The desired structure can be obtained in that a single block of sintered metal consists of particles of different sizes in the axial and/or longitudinal direction and is made to have different capillary structures in said directions or in that the blocks of sintered metal are composed of segments 24a, 24b, 29b, 29c differing in cross-section.

Another possibility to optimize the flow dynamics and the heat transfer between the reactor section 21 and the heat transport section 22 is to design the blocks 23 and 29 as frustoconical structures tapering, e.g., from the flow-receiving sides, or to provide flow passages in the blocks 23, 24a, 24b, and 29a, 29b, 29c.

The spatial arrangement of said blocks of sintered metal which constitute the reaction section 21 and the heat transfer section 22 is apparent from FIG. 4. In the block 29 of sintered metal, a central passage is concentrically surrounded by passages in which the blocks 23, 24a, and 24b are accommodated, each of which is surrounded by the boundary layer 28. It will be understood that the heat transfer section could alternatively be accommodated in flow passages extending through the blocks of sintered metal of the reactor section.

The working fluid vapor generated in the heat transfer section flows from the vapor header 33 through the vapor discharge line 32 as entraining vapor to a vapor jet compressor 34, which is connected at its suction side through a suction line 35 to an evaporator 36. Just as the reactor section 21 is accommodated in the heat transfer section 22, an exhaust gas condenser 37 consisting also of coarsely porous sintered metal is accommodated in the evaporator 36 consisting also of coarsely porous sintered metal so that the flow passage of the heat transfer section merge into the flow passages of the exhaust gas condenser. The hot exhaust gas from the reactor bed 24 flows through a heat-insulating spacing section 38 into the sintered metal of the exhaust gas condenser 37. The condensible constituents of the exhaust gas condense and the thus liberated heat is transferred through the boundary wall 28 into the evaporator 36, which consists also of sintered metal, so that the liquid working fluid 31 supplied to the evaporator is evaporated. Because the evaporator 36 is disposed on the suction side of the vapor jet compressor 34, temperatures below the dew point of the exhaust gases from the reactor section can always be achieved in the evaporator 36 and, as a result, in the exhaust gas condenser 37.

In the vapor jet compressor 34 the motive vapor from the heat transfer section 22 and the cold vapor from the evaporator 36 are mixed and the mixed vapors are condensed in a condenser 39 at an average temperature and an average pressure. The liquid working fluid is returned to the heat transfer section 22 through a liquid pump 40 and the working fluid supply line 30. A minor portion of the condensate is supplied to the evaporator 36 through a supply line 41 and an throttle 42. Useful heat is transferred from the condenser 39, e.g., to a heating circuit, not shown in detail.

The condensed liquid constituents of the exhaust flow together with the gaseous constituents into the exhaust gas header 43 and are discharged into the sewer through a siphon 44. The cooled stream of exhaust gas flows through an exhaust gas discharge line 45 into the outdoor air. The mixture 27 of fuel gas and air may be generated, e.g., in that fresh air is blown by a fan 46 through a venturi nozzle 47 into the mixing chamber 26.

That blowing of fresh air through the venturi nozzle 47 generates a subatmospheric pressure in a fuel gas chamber 48 so that fuel gas can be sucked through a line 49 and through a scrubber 50 if the latter is required. The supply of fuel gas is controlled by a timing value or by a modulating valve 53.

In a manner not shown in detail the liquid working fluid leaving the condenser 39 might be used to preheat the combustion air. For this purpose a heat exchanger would have to be incorporated in line 41 behind the junction of the branch leading to the pump 40 and before the throttle 42. Such heat exchanger is thermally coupled to the combustion air flowing into the mixing chamber 48.

The energy balance of the heating system shown in FIG. 3 is diagrammatically represented in FIG. 5. Conventional town gas is used as fuel gas and R 113 ($CCl_3F_3$) is used as a working fluid in the heat pump circuit. The same reference characters as in FIGS. 3 and 4 are used in FIG. 5 to designate the essential components of the heating circuit.

When 1 $m^3$ fuel gas and 9 $m^3$ air having a relative humidity of 70% are supplied at ambient temperature to the reactor section 21, 35,900 kJ heat will be liberated in the reactor bed of that heat, 35,530 kJ are contained in the fuel gas and 370 kJ in the air. At a catalysis temperature of about 350° C., about 202 kg entraining vapor are generated at a temperature of 110° C. That quantity of entraining vapor contains about 23,700 kJ of energy. 78 kg working fluid vapor at a temperature of 30° C., corresponding to 12,100 kG, are supplied from the evaporator 36 via the suction side of the vapor jet compressor 34. This requires the vapor jet compressor 34 to operate at an efficiency of 0.38. As a result, 35,800 kJ are liberated in the condenser so that a heating circuit 54 can be operated with a heat output of 10 kW at a flow temperature of 90° C. and a return flow temperature of 70° C. while water is circulated in the heating circuit at a rate of 7.2 liters per minute. At that heat output, the liquid pump 40 in the heat pump circuit circulates refrigerant R 113 at a rate of 3.4 liters per minute. In the exhaust gas at a temperature of about 30° C., about 100 kg of nonusable heat are delivered to the environment.

Such a plant can be expected to operate at a combustion efficiency in the range between 108% and 110% with respect to the lower heating value Hu of the fuel gas. Owing to the heat pump circuit, that plant efficiency does not depend on the return flow temperature in the heating circuit 54, as would be the case in conventional heating systems comprising heating value equipment.

It will be understood that a heat exchanger designed in accordance with FIG. 3 could also be used as a unit for driving a machine. Specifically, such motive vapor generator could be used to drive a so-called screw motor, which would have to be connected in circuit instead of the vapor jet pump 34.

In that embodiment of the heat exchanger in accordance with the invention, the jet pump having an integrated sintered-metal evaporator disclosed in German Patent Application P 34 31 240.4 may also be used. The heat exchanger in accordance with the invention can also be used as a motive vapor generator for the circuits described in that patent application.

What is claimed:

1. A heat exchanger comprising a reactor section which is connected to supply lines for a flowable composition and through which a flowable composition is passed for effecting a chemical reaction and which comprises a metal structure having a large internal surface comprising a catalytic substance, and a heat transfer section including at least one gas-tight flow passage for a separate heat transfer fluid of the type having a selected phase transition temperature wherein:

said metal structure comprises porous, sintered metal, said sintered metal being directly heat conductivity joined to a gastight boundary layer which has a high heat transfer coefficient, the flow passage of said heat transfer section comprising in cross-section, at least in part of its length, porous sintered metal which is directly heat conductively joined to said boundary layer on that side of the reactor section which is opposite to the sintered metal, and means to conduct said separate heat transfer fluid through said flow passage of said heat transfer section in correlation to the chemical reaction so that the heat transfer fluid will undergo a phase transition at said phase transition temperature thereof in response to said flowable composition undergoing the chemical reaction.

2. A heat exchanger according to claim 1 wherein at least two supply lines for the flowable composition are provided which are spaced apart to supply the flowable composition to different spaced apart regions of the reactor section.

3. A heat exchanger according to claim 1 wherein at least two exit lines for products of the catalytic reaction are provided which are spaced apart to remove products from spaced apart regions of the reactor section.

4. A heat exchanger according to claim 1 wherein a cooler is disposed in the product gas stream leaving the reactor section and is adapted to extract heat from the product gas stream by cooling.

5. The heat exchanger as claimed in claim 4 wherein the cooler is adapted to extract heat from the product gas stream by a condensation of the condensable gases contained in the product gas stream.

6. A heat exchanger according to claims 1, 2 or 3 characterized in that the reactor section (2; 21) comprises at least one flow passage, which is enveloped by the boundary layer (4; 28) and is particularly disposed in the flow passage of the heat transfer section (3; 22).

7. A heat exchanger according to claim 1 characterized in that the flow-discharging surface area and flow-receiving surface area of the porous heat-conductive material (5, 10, 23, 29) in the reactor section and/or heat transfer section (2, 3; 21, 22) exceeds to the cross-sectional area of the flow passage of the reactor section and/or the heat transfer section (2; 21), respectively, and in particular is oblique.

8. A heat exchanger according to claim 1, characterized in that the flow passages of the reactor section and of the heat transfer section (2, 3; 21, 22) comprise a downstream portion in which a smaller part of the cross-sectional area of the flow passages is filled with solid particles (11) of the porous heat-conductive material than in an upstream portion.

9. A heat exchanger according to claim 8, characterized in that the proportion in which the cross-sectional area of the flow passages is filled with solid particles (11) of the porous heat-conductive material decreases in the direction of flow continuously.

10. A heat exchanger according to claim 8 or 9, characterized in that the porous heat-conductive material in the reactor section and in the vapor-generating section (2, 3; 21, 22) consists of a block (5, 10, 6; 23, 24, 29), in which the solid particles are less densely packed in the downstream portion than in the upstream portion.

11. A heat exchanger according to claim 8 or 9, characterized in that the blocks (5, 10, 6; 23, 24, 29) of the reactor section the heat transfer section (2, 3; 21, 22) are composed of a plurality of block segments (24, 24a, 24b, 29a, 29b, 29c).

12. A heat exchanger according to claim 8 or 9 characterized in that the boundary layer (4; 28) of the flow passages of the reactor section and the heat transfer section (2, 3; 21, 22) is clear of the porous heat-conductive material (5, 10, 6; 23, 29, 29a) in the entrance portion of the flow passages.

13. A heat exchanger according to claim 1 characterized in that the porous heat-conductive material (5, 10; 23) in that portion of the reactor section (2; 21) which is the upstream portion in the flow of the educts (8; 27) serves to preheat the flowable composition and the flowable composition.

14. A heat exchanger according to claim 4, characterized in that the cooler (37) includes sintered metal.

15. A heat exchanger according to claim 14, characterized in that the reactor bed (24) and the cooler (37) are thermally separated from each other by a spacing section (38).

16. A heat exchanger according to claim 4, characterized in that the cooler (37) comprises an evaporator (36) of a heat pump circuit.

* * * * *